(12) United States Patent
Nielsen

(10) Patent No.: US 7,673,523 B2
(45) Date of Patent: Mar. 9, 2010

(54) TUBULAR INSERT FOR A MAGNETIC INDUCTIVE FLOW METER

(75) Inventor: Søren Nielsen, Sønderborg (DK)

(73) Assignee: Siemens Aktiengesellschaft, Munich (DE)

( * ) Notice: Subject to any disclaimer, the term of this patent is extended or adjusted under 35 U.S.C. 154(b) by 74 days.

(21) Appl. No.: 11/667,333

(22) PCT Filed: Nov. 10, 2004

(86) PCT No.: PCT/EP2004/012725

§ 371 (c)(1),
(2), (4) Date: Nov. 16, 2007

(87) PCT Pub. No.: WO2006/050744

PCT Pub. Date: May 18, 2006

(65) Prior Publication Data

US 2008/0196510 A1 Aug. 21, 2008

(51) Int. Cl.
*G01F 1/58* (2006.01)

(52) U.S. Cl. .................................. 73/861.12

(58) Field of Classification Search ............ None
See application file for complete search history.

(56) References Cited

U.S. PATENT DOCUMENTS 5,773,723 A 6/1998 Lewis et al.
6,269,530 B1 * 8/2001 Armitage et al. ......... 73/861.11

FOREIGN PATENT DOCUMENTS

| DE | 102006018415 | * 10/2007 |
|---|---|---|
| EP | 0 766 069 A1 | 4/1997 |
| EP | 0 895 066 A1 | 2/1999 |
| JP | 59198318 A | 11/1984 |
| JP | 10197301 A | 7/1998 |

* cited by examiner

*Primary Examiner*—Harshad Patel

(57) ABSTRACT

There is described a tubular insert for a magnetic inductive flowmeter, a production method for such a tubular insert and a flowmeter. The tubular insert essentially comprises an electrically-insulating material, in particular, rubber, reinforced with a metal mesh, at least in a measuring section. The tubular metal mesh comprises one or more mesh sections, pre-prepared from sheet mesh by stamping, bending and welding butt edges running essentially parallel to the tube axis such as to form an essentially tubular metal mesh. The tubular metal grid is embedded in the electrically-insulating material passing therethrough and the electrically-insulating material essentially covers the inner and out surfaces of the tubular material. A robust, tubular insert is thus achieved, with a corresponding cheap production cost.

14 Claims, 2 Drawing Sheets

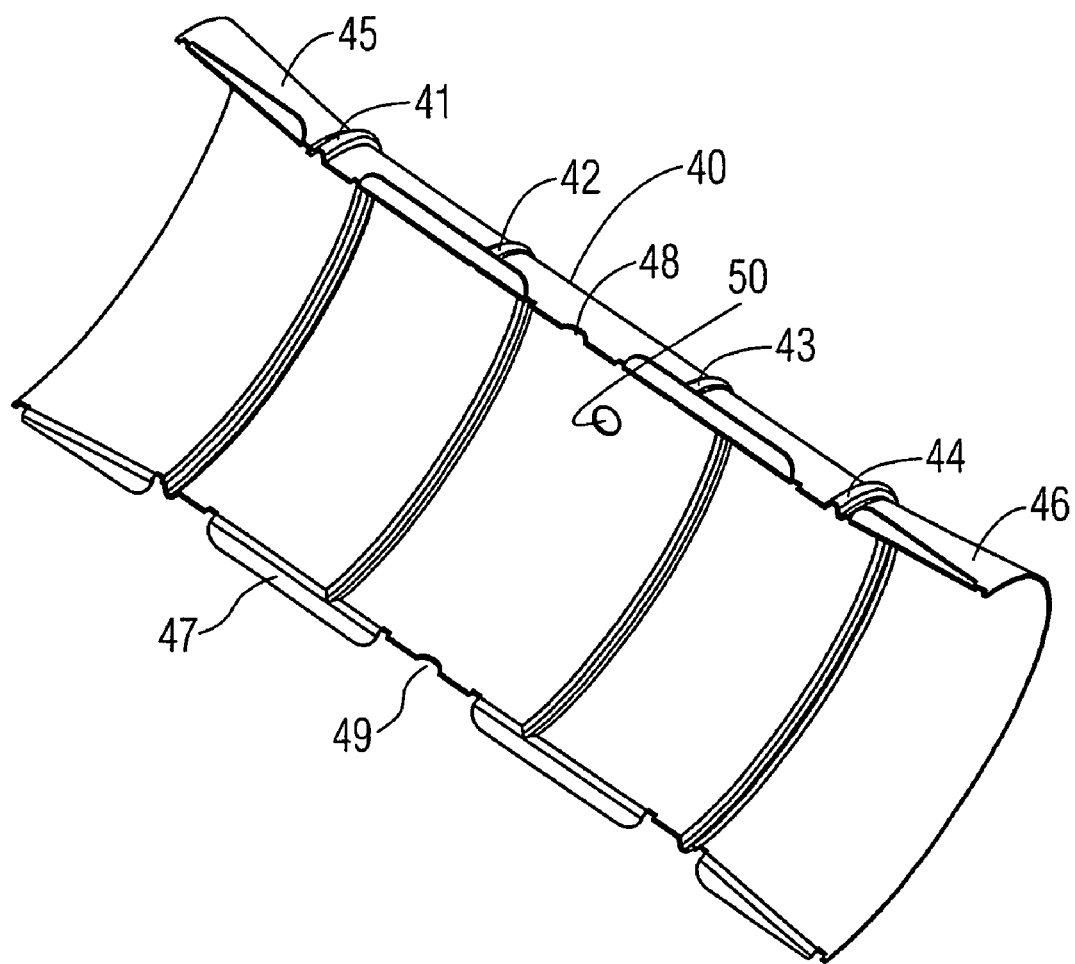

TUBULAR INSERT FOR A MAGNETIC INDUCTIVE FLOW METER

CROSS REFERENCE TO RELATED APPLICATIONS

This application is the US National Stage of International Application No. PCT/EP2004/012725, filed Nov. 10, 2004, incorporated by reference herein in its entirety, and claims the benefit thereof.

FIELD OF INVENTION

The invention relates to a tubular insert for a magnetic inductive flow meter, to a production method for such a tubular insert and to a flow meter which is equipped with such a tubular insert.

BACKGROUND OF INVENTION

Magnetic inductive flow meters use Faraday's law of induction to determine the flow velocity of a through-flowing fluid. A magnetic field is generated perpendicular to the direction of flow. In this magnetic field, charges which are transported with the fluid generate a voltage perpendicular to the magnetic field and to the flow direction, which voltage can be tapped with the aid of electrodes. The measurement voltage thus determined is proportional to a flow velocity determined over the flow cross-section. Flow meters of this type must, in order to ensure measurement accuracy, maintain largely constant geometric dimensions, irrespective of the pressure of the through-flowing fluid prevailing at any time. This pressure resistance is frequently achieved by a steel measuring tube through which the fluid flows. On the other hand, this measuring tube must not interfere with the electric and magnetic fields which permeate the fluid in the region of a measuring section. For this reason, linings or inserts are used in the measuring tube which are typically produced from ceramic or plastic materials. These fulfill the requirements of being electrically non-conductive and of scarcely affecting the magnetic field. At the same time, they protect the metal wall of the measuring tube against corrosion. Here, inserts made of a plastic material have the advantage that they are particularly easy to handle. Especially in the case of hardened plastic linings or inserts, there is, however, the problem that they are either not sufficiently dimensionally stable or that they lose their dimensional stability over time. For example, a plastic insert tends, where a pressure that is substantially lower than atmospheric pressure occurs, to detach itself from the inner wall of the measuring tube, thereby reducing the flow cross-section.

From EP 0 895 066 A1, a tubular insert for a magnetic inductive flow meter is known, which insert is composed of an elastomer, preferably synthetic rubber, as an electrically insulating material. In order for the tubular insert to be less elastic in its measuring section, strips made of steel were embedded in the rubber in this area. In the area of the two end sections, no reinforcement is present. No details are given in this printed publication about how the steel strips are embedded in the rubber, i.e. how a reinforced tubular insert can be produced. The known insert has the disadvantage that the rubber on the inner surface of the steel strips is not permanently fastened and the geometric dimensions of the tubular insert can consequently change in the event of pressure fluctuations.

From U.S. Pat. No. 5,773,723 a magnetic inductive flow meter comprising a measuring tube is known, the inner surface of which is lined with perfluoralkoxy (PFA). This lining is stabilized in a measuring section by an embedded metal grid so that the internal diameter of the tube remains constant. The essentially tubular metal grid is formed by spiral bending of a grid strip and welding of the abutting edges of the grid strip. Multiple wires running parallel to the tube axis and distributed evenly over the circumference of the tube are welded onto the outer surface of the grid. These serve to ensure a constant spacing between the inner wall of the measuring tube and the outer surface of the grid. The grid is inserted into the measuring tube and centered there by the welded wires. On the two end sides, the tubular metal grid is welded to the inner surface of the measuring tube. The lining material made of PFA is inserted between an injection mould inserted in the measuring tube and the inner wall of the measuring tube in an injection molding method, flows through the openings in the metal grid and fills the interspace between the grid and the inner wall of the measuring tube, forming a layer of constant thickness. The known lining of a measuring tube has the disadvantage, however, that its production is comparatively costly. Moreover, it is difficult when producing the tubular metal grid from a spirally bent metal grid strip to mould on tube ends running conically. Conically running tube ends of the inner cross-section are, however, frequently provided in magnetic induction flow meters in order to achieve a higher flow velocity and thus a better measuring accuracy in the measuring section.

SUMMARY OF INVENTION

An object of the invention is to create a tubular insert for a magnetic inductive flow meter which, when it is used in a flow meter, is robust and results in a flow meter of enduringly high measuring accuracy and comparatively low production cost.

To achieve this object, the new tubular insert for a magnetic inductive flow meter of the type cited in the introduction has the features specified in a independent claim. A method for the production of the tubular insert is described in a further independent claim and a flow meter having such a tubular insert is described in another independent claim. Advantageous further developments of the invention are indicated in dependent claims.

The invention has the advantage that a tubular insert for a magnetic inductive flow meter can be fully prefabricated outside the measuring tube with a previously embedded metal grid for mechanical reinforcement. The production cost of a flow meter is in this way advantageously reduced. At the same time, the tubular insert is characterized by lasting durability and geometric stability due to the mechanical reinforcement with a metal grid. The electrically insulating material is held in its place by mechanical forces alone. Since it is located on both sides of the metal grid and passes through the openings in the metal grid, the electrically insulating material would have to tear apart in order to detach itself from the metal grid and to collapse in the event of any reduced pressure in the measuring tube. No adhesive, which could restrict any long-term stability of the tubular insert, is therefore required between the electrically insulating material and the metal grid. Moreover, due to the structure of the tubular insert, fewer limitations exist with regard to the selection of a suitable electrically insulating material so that the choice can be made between a larger plurality of suitable materials. This is advantageous since the possible field of application of a flow meter equipped with a tubular insert of this type is widened. Flexible electrically insulating materials can also be used since the stability of the geometric dimensions desired in the measuring section is reliably achieved through the mechanical reinforcement with the metal grid.

Since the abutting points of the grid part(s) on which welding has to be carried out run essentially parallel to the tube axis, the welding process is comparatively easy to organize since a welding device can be guided without difficulty along this track. In addition, this course of the abutting points simplifies the production of grid parts in a simple stamping and bending process. Such preformed grid parts can readily be fashioned with a bent profile which increases the stability. Furthermore, it is possible without difficulty in the bending process to preform the grid parts such that a tubular metal grid is produced with a conical shape at its two tube ends. By contrast, in the known use of a metal strip for mechanical reinforcement, the strip would have to be subdivided into a central part and two conical end parts in order to achieve such a form. This would be associated with a considerably higher production cost and possibly with a loss of stability at the abutting points between the central part and the respective end part. Compared with the use of a metal-grid tube as a basis for producing the tubular metal grid, the use of grid parts preformed from perforated sheet has the advantage that the latter are substantially cheaper to procure. Additional expensive operating steps would be necessary on a finished metal-grid tube in order to ensure that in the case of a pressing or casting method the electrically insulating material passes through the openings in the metal grid and essentially covers both sides of the metal grid.

The metal grid for reinforcement can serve to shield the coils of a magnetic inductive flow meter from electrostatic fields. An additional screening sheet is not then necessary for shielding.

A minimum spacing between the outer surface of the tubular metal grid and the opposing inner surface of a pressing or casting mould can advantageously be ensured if the tubular metal grid has bumps in a radial direction. In this way, a predetermined minimum thickness of the electrically insulating material on the respective side of the metal grid can be adhered to. These bumps can be fashioned as encircling ribs, for example, which are arranged at defined intervals relative to one another and are also suitable for additionally stiffening the metal grid against deformations. These spacers ensure that the electrically insulating material can flow during the pressing or casting process onto the outer surface of the tubular metal grid.

As an alternative to this, the spacers could also be fashioned as bumps in the casting mould. However, additional stiffening of the tubular metal grid is not then achieved.

Advantageously, the tubular metal grid can consist of two essentially identical preformed grid parts, which can also be designated half shells. Such half shells can be produced in a simple stamping and bending step. This leads to a further reduction of the production costs since the production process is faster and cheaper than rolling and welding the grid part.

Moreover, where the grid is constructed in this way, it is easily possible in an advantageous manner to stamp a profile for reinforcement and as a spacer into the metal grid.

If as grid parts the two half shells are equipped at the abutting points with brackets bent outwardly in a radial direction, then this has the advantage that the welding process is particularly simple to organize since the brackets are readily accessible to a welding device, for example for electrical spot welding.

Rubber, which possesses good elasticity can advantageously be used as an electrically insulating material. If the tubular insert is furnished at each of the two ends with a fastening flange and if no metal grid is embedded in at least one of the two, then the tubular insert can, despite the flange, be inserted in a simple manner into a measuring tube of a flow meter. For insertion into the measuring tube of the flow meter, the flexible flange is simply pressed together and guided through the measuring tube. The mechanically reinforced measuring section which is connected to the flange is inserted fully into the measuring tube. Once the flange has passed through the measuring tube it can resume its original shape. The insert is then held by the two flanges securely in the measuring tube.

As an alternative to rubber, other electrically insulating materials, for example fluoropolymers or PFA, can of course be used for the tubular insert. A flangeless design for a steel tube, and a magnet arrangement that is fastened onto the outer surface of the steel pipe, is also possible.

A tubular metal grid which is advantageously composed of high-grade steel possesses particularly high stability at comparatively low thickness. However, brass or aluminum are also suitable as materials for the metal grid.

A robust tubular insert can be produced particularly favorably if one or more grid parts are prefabricated by stamping and bending from perforated sheet and are welded together on butt edges running essentially parallel to the tube axis so as to form an essentially tubular metal grid and if the tubular metal grid is embedded in the electrically insulating material by a pressing or casting method such that the openings in the metal grid have the electrically insulating material passing therethrough and the electrically insulating material essentially covers the inner surface and outer surface of the tubular metal grid. This has in particular the advantage that the tubular metal grid can be welded from grid parts which are produced from an essentially rectangular perforated sheet. After the stamping or cutting of the perforated sheet, this sheet has on one side an edge length which corresponds to the length of the tube section to be mechanically reinforced. By bending, tube shell parts that are open on one side are formed from the initially flat perforated sheet part as grid parts which can be welded to one another into a closed tube in a simple manner along a butt edge running essentially parallel to the tube axis. In the bending process, the grid parts can readily be furnished with encircling straps to increase their stability. The beveling of brackets pointing radially outwards is also possible without difficulty. The encircling ribs ensure in a simple manner, when the tubular metal grid is inserted in a casting mould, a minimum spacing which is required in order that in a pressing or casting process an electrically insulating material passes through openings in the metal grid and covers its two sides.

BRIEF DESCRIPTION OF THE DRAWINGS

The invention as well as developments and advantages will be explained in detail below with the aid of the drawings in which an exemplary embodiment of the invention is shown.

FIG. 3 shows a detailed view of a longitudinal section through a tubular insert and FIG. 4 shows a perspective view of a grid part prefabricated by stamping and bending.

DETAILED DESCRIPTION OF INVENTION

Figure 1:
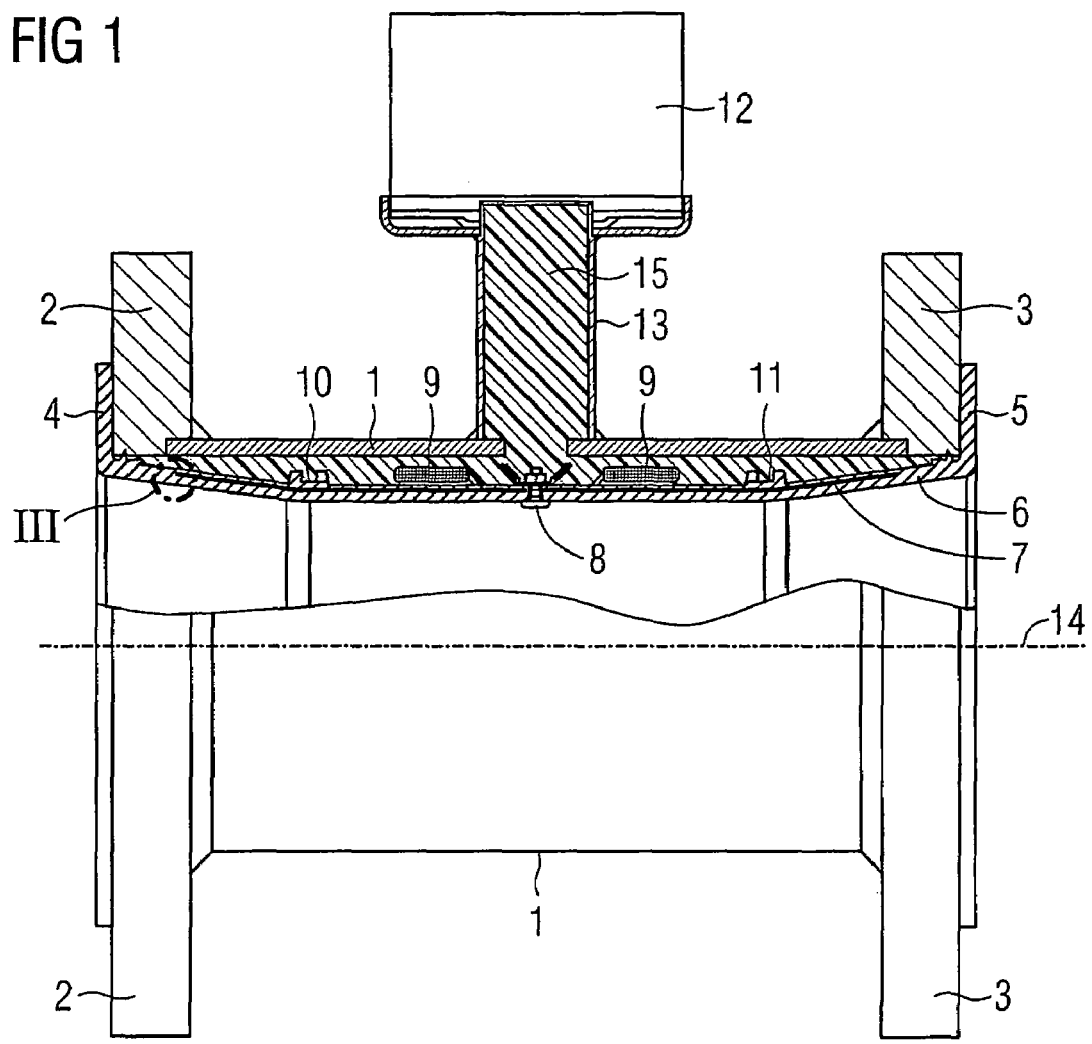
FIG. 1 shows a magnetic inductive flow meter with partial longitudinal section.

In the figures, identical parts are labeled with identical reference symbols. A magnetic inductive flow meter according to FIG. 1 has a measuring tube 1 which is furnished at its two ends with a flange 2 or a flange 3 for insertion into a tubing. In the upper part of FIG. 1, the flow meter is drawn in a longitudinal section to aid clarity. Lying on the outer surfaces of the two fastening flanges 2 and 3 is in each case an end section 4 or 5, fashioned flange-like, of a tubular insert 6 made of rubber. The tubular insert 6 carries in a measuring section, in which it is mechanically reinforced by a tubular metal grid 7, four electrodes and two coils. Of these, only one electrode 8 for reference potential and one coil 9 can be seen in FIG. 1. Circular grooves 10 and 11 serve to secure the position of electric leads which are necessary for connecting the electrodes and the coils to a control and evaluation unit 12. For reasons of clarity, the leads are not shown in FIG. 1. To assemble the flow meter, firstly a tubular insert 6, the production of which will be described in even more detail below, is equipped with two coils and the electric leads. One of the two end sections 4 and 5, for example the end section 4 which has no mechanical reinforcement, is folded together such that it can be inserted through the internal cross-section of the measuring tube 1. As soon as the equipped insert 6 is fully inserted into the measuring tube 1, the end section 4 returns to its original shape and the insert 6 is held in its position in the measuring tube 1 by the two end sections 4 and 5 which butt against the outer surfaces of the flanges 2 and 3. After the tubular insert has been inserted into the measuring tube 1, the electrodes, for example the electrode 8, are fastened into the tubular insert 6 through holes which are located in the measuring tube 1. The cavities which remain between the equipped insert 6 and the measuring tube 1 are filled with a curable sealing compound 15. As soon as this sealing compound has cured, the insert 6 is fixed in a stable manner in the measuring tube 6. In addition, it is positioned by its end sections 4 and 5 which, upon installation of the flow meter in a tubing, are squeezed between the flange 2 and the respectively opposing flange in the tubing or between the flange 3 and another flange in the tubing. An earthed screening sheet can be inserted between the magnetic coil 9 and the insert 6. This can, however, be omitted if the metal grid 7 already provides adequate shielding.

Figure 2:
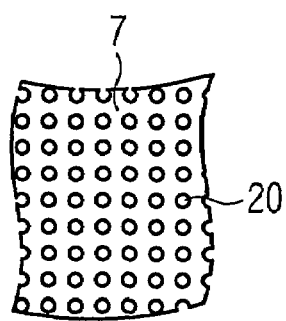
FIG. 2 shows a structure of a metal grid.

FIG. 2 shows a plan view of a section of the metal grid 7 in which the grid structure can readily be recognized. Openings 20 arranged in rows and columns are located in the metal grid 7, which openings in a finished tubular insert 6 are completely filled with rubber as an electrically insulating material.

Figure 3:
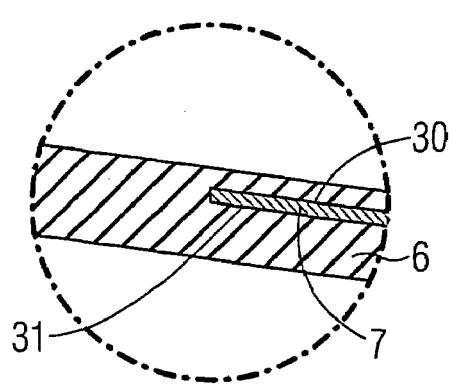

FIG. 3 shows in detail an edge area of the tubular metal grid 7 which is embedded in rubber as an electrically insulating material of the insert 6. It can clearly be seen that both an outer surface 30 and an inner surface 31 of the tubular metal grid 7 are covered by the electrically insulating material. By completely filling the openings 20 (FIG. 2) and covering the sides 30 and 31 with electrically insulating material, an adhesive for fastening to the metal grid 7 can be dispensed with. The electrically insulating material has to tear apart in the openings 20 in order to be able to detach itself from the metal grid 7.

The tubular metal grid 7 (FIG. 1) is composed of two halves, of which one is shown in FIG. 4. For reasons of clarity, the openings in the grid structure have not been shown. The two halves are fashioned identically. It will therefore suffice below to describe only one grid part shown in FIG. 4 as one of the two halves. This grid part is produced in a comparatively low-cost production step by stamping and bending from a perforated sheet part. In the bending process, four outwardly projecting ribs 41, 42, 43 and 44 are molded on. These serve in a pressing or casting mould as spacers between the outer surface of the metal grid and the mould. At the same time, they increase the stability of the grid part 40. In the same bending process, conical ends 45 and 46 are molded on to the grid part 40. Furthermore, the grid part 40 is furnished with eight brackets bent outwardly in a radial direction, one of which brackets carries the reference character 47. If the two halves of a tubular metal grid are laid together such that a tubular shape emerges, then the brackets come to lie on one another in pairs and can easily be welded together with a welding device. It is advantageous here that the abutting points between the two halves run in a direction parallel to the tube axis 14 (FIG. 1). Openings 48 and 49, only half of which is visible in each case in FIG. 4 since the other half in each case is located in the counterpart that is not shown, serve for guiding through two electrodes by means of which a measurement voltage is tapped during measurement mode. A reference-potential electrode can be inserted through an opening 50. A coil, not shown in FIG. 4, for generating a magnetic field can be arranged essentially concentrically in relation to the opening 50. The brackets do not therefore constitute an obstacle at all when the coils are attached.

As an alternative to the embodiment shown with brackets bent at right angles in a radial direction, an overlap of the two tubular shell parts could of course be provided at the abutting points at which these are welded.

A further alternative to the exemplary embodiment shown is a tubular insert for a flangeless version of a flow meter. The magnetic exciter arrangement can be as a further alternative be attached on the outside of the steel tube. Besides the exemplary embodiment described with rubber as an electrically insulating material, fluoropolymers or other suitable materials can alternatively be used. Depending on the requirements in terms of the strength of the tubular insert, brass or aluminum can also be employed as an alternative to the use of high-grade steel.

The invention claimed is:

1. A tubular insert for a magnetic inductive flow meter, comprising:
    a tubular metal grid for mechanical reinforcement at least in a measuring section of the magnetic inductive flow meter, wherein the tubular metal grid has openings and consists of two essentially identical preformed grid parts; and
    an electrically insulating material, wherein the tubular metal grid is embedded in the electrically insulating material, wherein the openings are filled with the electrically insulating material, and wherein the electrically insulating material essentially covers the inner surface and the outer surface of the tubular metal grid.

2. The tubular insert as claimed in claim 1, wherein the embedding is based upon a pressing operation.

3. The tubular insert as claimed in claim 1, wherein the embedding is based upon a casting operation.

4. The tubular insert as claimed in claim 1, wherein the metal grid comprises grid parts welded to butt edges running essentially parallel to a tube axis.

5. The tubular insert as claimed in claim 1, wherein the tubular metal grid has bumps in a radial direction.

6. The tubular insert as claimed in claim 1, wherein the two grid parts have brackets at abutting points bent outwards in a radial direction, and wherein the two grid parts are welded to one another at the brackets.

7. The tubular insert as claimed in claim 1, wherein the electrically insulating material is rubber.

8. The tubular insert as claimed in claim 7, wherein the tubular insert has a fastening flange on each of two ends of the tubular insert.

9. The tubular insert as claimed in claim 8, wherein at least one fastening flange has no metal grid for reinforcement.

10. The tubular insert as claimed in claim 9, wherein the metal grid is composed of high-grade steel.

11. A magnetically inductive flow meter, comprising:
a measuring tube; and
a tubular insert having:
- a tubular metal grid for mechanical reinforcement at least in a measuring section of the magnetic inductive flow meter, wherein the tubular metal grid has openings and consists of two essentially identical preformed grid parts, and
- an electrically insulating material, wherein the tubular metal grid is embedded in the electrically insulating material, wherein the openings are filled with the electrically insulating material, and wherein the electrically insulating material essentially covers the inner surface and the outer surface of the tubular metal grid.

12. The magnetically inductive flow meter as claimed in claim 11, wherein the a measuring section is mechanically reinforced based upon the tubular metal grid.

13. The magnetically inductive flow meter as claimed in claim 11, wherein the tubular insert has four electrodes and two coils.

14. The magnetically inductive flow meter as claimed in claim 11, wherein circular grooves secure a position of electric leads used to connect electrodes and coils.

* * * * *